United States Patent
Li et al.

(10) Patent No.: US 7,636,060 B2
(45) Date of Patent: Dec. 22, 2009

(54) METHOD AND APPARATUS FOR COLLECTING SUBFRAMES OF SATELLITE NAVIGATION DATA

(75) Inventors: Kuan-i Li, Kaohsiung (TW); Kung-shuan Huang, Changhua County (TW); Kun-tso Chen, Fang-Yuan Hsiang (TW)

(73) Assignee: MEDIATEK Inc., Hsin-Chu (TW)

( * ) Notice: Subject to any disclaimer, the term of this patent is extended or adjusted under 35 U.S.C. 154(b) by 0 days.

(21) Appl. No.: 11/620,303

(22) Filed: Jan. 5, 2007

(65) Prior Publication Data

US 2008/0165057 A1    Jul. 10, 2008

(51) Int. Cl.
*G01S 1/00*   (2006.01)
(52) U.S. Cl. .................................. 342/357.15
(58) Field of Classification Search ......... 342/357.01–357.17; 701/213, 214, 215
See application file for complete search history.

(56) References Cited

U.S. PATENT DOCUMENTS

| | | | | |
|---|---|---|---|---|
| 6,150,980 A * | 11/2000 | Krasner | ............... | 342/357.1 |
| 6,275,185 B1 | 8/2001 | Loomis | | |
| 6,292,748 B1 * | 9/2001 | Harrison | ............... | 701/213 |
| 6,433,734 B1 * | 8/2002 | Krasner | ............... | 342/357.09 |
| 6,611,756 B1 * | 8/2003 | Chen et al. | ............... | 701/213 |
| 6,775,802 B2 * | 8/2004 | Gaal | ............... | 714/758 |
| 6,804,290 B1 | 10/2004 | King et al. | | |
| 6,831,911 B1 * | 12/2004 | Sridharan et al. | ............... | 370/345 |
| 7,187,322 B1 * | 3/2007 | Damidaux et al. | ............... | 342/357.02 |
| 2002/0049536 A1 * | 4/2002 | Gaal | ............... | 701/213 |
| 2002/0186165 A1 | 12/2002 | Eschenbach | | |
| 2005/0174284 A1 * | 8/2005 | Abraham et al. | ............... | 342/357.09 |
| 2007/0139264 A1 * | 6/2007 | Kangas | ............... | 342/357.12 |

FOREIGN PATENT DOCUMENTS

EP    1293797 A1    3/2003

* cited by examiner

*Primary Examiner*—Thomas H Tarcza
*Assistant Examiner*—Nga X Nguyen

(57) ABSTRACT

A method and apparatus for collecting subframes of navigation data of satellites are disclosed. In the method of the present invention, the subframe is divided into several sub-units, each sub-units includes one or more words. When a receiver receives a subframe with a subframe ID, the respective required sub-units of the subframe are checked. A dummy sub-unit is not necessary to be considered. Valid ones of the required sub-units are collected. If not all the required sub-units of the subframe have been collected, the absent sub-units are to be collected when the next subframe with the same subframe ID is received. Some protection schemes can be applied to raise the reliability of such sub-unit collection. Especially when the signal is weak or unstable, the present invention may significantly improve the TTFF (Time To First Fix) performance of the receiver.

21 Claims, 14 Drawing Sheets

METHOD AND APPARATUS FOR COLLECTING SUBFRAMES OF SATELLITE NAVIGATION DATA

TECHNICAL FIELD OF THE INVENTION

The present application relates to time-to-first-fix (TTFF) reduction in satellite communication, more particularly, to a novel method for collecting subframes of satellite navigation data. By using this method, TTFF performance can be improved. The present invention also relates to a Global Navigation Satellite System (GNSS) receiver implementing the subframe collection method.

BACKGROUND OF THE INVENTION

Satellite positioning has been widely used in various applications. In satellite positioning systems such as Global Navigation Satellite System (GNSS), a cold start state means that no information such as receiver position, observation time, satellite navigation information (e.g. almanac or ephemeris) are available.

For a GNSS (e.g. GPS) receiver, sensitivity is a major performance criterion. TTFF (Time to First Fix) under the cold start state is a representative standard for receiver sensitivity. To fix a three dimensional position, at least four satellites are required. The TTFF depends on time to acquire satellite signals of at least four visible satellites and time to download required ephemeris by demodulating the navigation data. When the received signal power is efficiently strong, it takes a few seconds to acquire the satellite signals and about 27 seconds to obtain the required ephemeris. If the signal power is weak, the time to acquire the satellite signals and the time to download the ephemeris are both extended. No matter the signal power is strong or weak, it is apparent that the time to obtain the ephemeris is a dominant factor of TTFF.

The satellite navigation data is transmitted in pages. Five subframes make a page (or a frame). Each subframe requires 6 seconds to transmit. Accordingly, to transmit a page, 30 seconds are required. Each subframe contains ten words, which will be further described in detail later. FIG. 1 schematically and generally shows data structure of one page of the navigation data. Satellite Navigation data include ephemeris and almanac. Each satellite broadcasts its own ephemeris. In addition, each satellite transmits almanac of all satellites, which is a coarse version of the ephemeris. The essential satellite ephemeris and clock parameters are transmitted in Subframe 1, Subframe 2 and Subframe 3. Almanac is transmitted in Subframe 4 and Subframe 5. As shown in FIG. 2, a complete almanac is distributed into Subframes 4 and 5 of 25 pages. To transmit 25 pages of the navigation data, 12.5 seconds are required. Information carried in Subframes 1-3 is the same for these 25 pages if no update occurs. In other words, the information in Subframes 1-3 is repeated once per 30 seconds. It is necessary to collect Subframes 1 to 3 so as to obtain a complete ephemeris of the satellite. In general, ephemeris of one satellite is updated per two hours.

FIG. 3 is a flow chart showing a conventional process for collecting ephemeris. The process starts in step S10. When a receiver receives a subframe SF(i) (step S20), the receiver checks the ten words of the subframe SF(i) to see if these ten words are correct by checking parity of each word (step S30). If parity check indicates an error in any of the ten words, this subframe SF(i) is discarded. If the ten words are all correct, then this subframe SF(i) is passed to the next step. In step S40, it is checked if this subframe SF(i) is one of Subframes 1 to 3. If so, this subframe SF(i) is stored in a buffer; in addition, flag SF(i)_collected is set (step S50). In step S60, it is checked if Subframes 1 to 3 are all collected. That is, it is checked if the complete ephemeris is obtained. If so, a navigation database is updated (step S70). If not, the whole process should be repeated. Briefly, when there is an error among the ten words of a received subframe, the subframe is discarded. If, unfortunately, the subframe of the next page also has an error, the receiver again needs to wait for another 30 seconds. This results in considerably long time consumption, and thereby seriously influencing TTFF performance of the receiver.

SUMMARY OF THE INVENTION

An objective of the present invention is to provide a subframe collecting method. By using the subframe collecting method, the time to collect required data such as ephemeris can be significantly reduced, and thereby TTFF performance can be improved. For example, the present invention is of advantageous for twinkle receiving. When a vehicle carrying a receiver passes by a tree or tall building, signal fading may occur temporarily. The subframe collection method can facilitate the receiver to rapidly collect required data in a shorter period of time.

Another objective of the present invention is to provide a subframe collecting apparatus. The subframe collecting apparatus implements the subframe collecting method to collect ephemeris in a shorter period of time.

In the subframe collecting method of the present invention, a subframe of navigation data is divided into smaller sub-units. Each sub-unit is checked and collected if it is correct. After all sub-units containing the required information of a specific subframe are collected, the collection of this specific subframe is completed.

The subframe collecting apparatus in accordance with the present invention executes the subframe collecting method above. When a subframe consisting of a plurality of sub-units is received, the subframe collecting apparatus in accordance with the present invention checks each sub-unit of the subframe and collects the sub-unit if it is correct. If all sub-units containing the required information of the subframe are collected, the collection of this specific subframe is completed.

DETAILED DESCRIPTION OF THE INVENTION

The present invention will be described in detail as follows.

Figure 1:
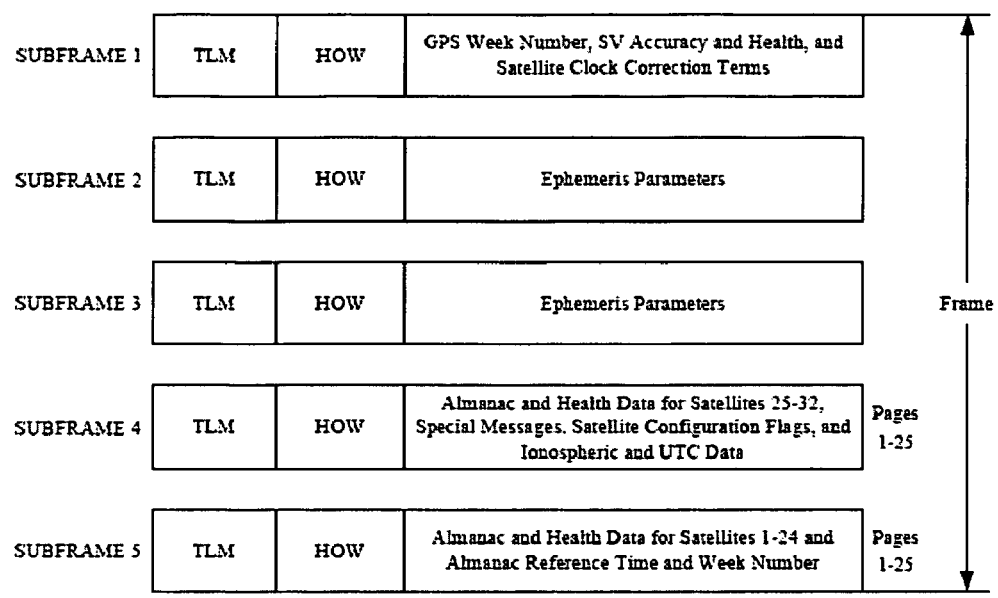
FIG. 1 is a schematic and general illustration showing data structure of a page of navigation data.
Figure 2:
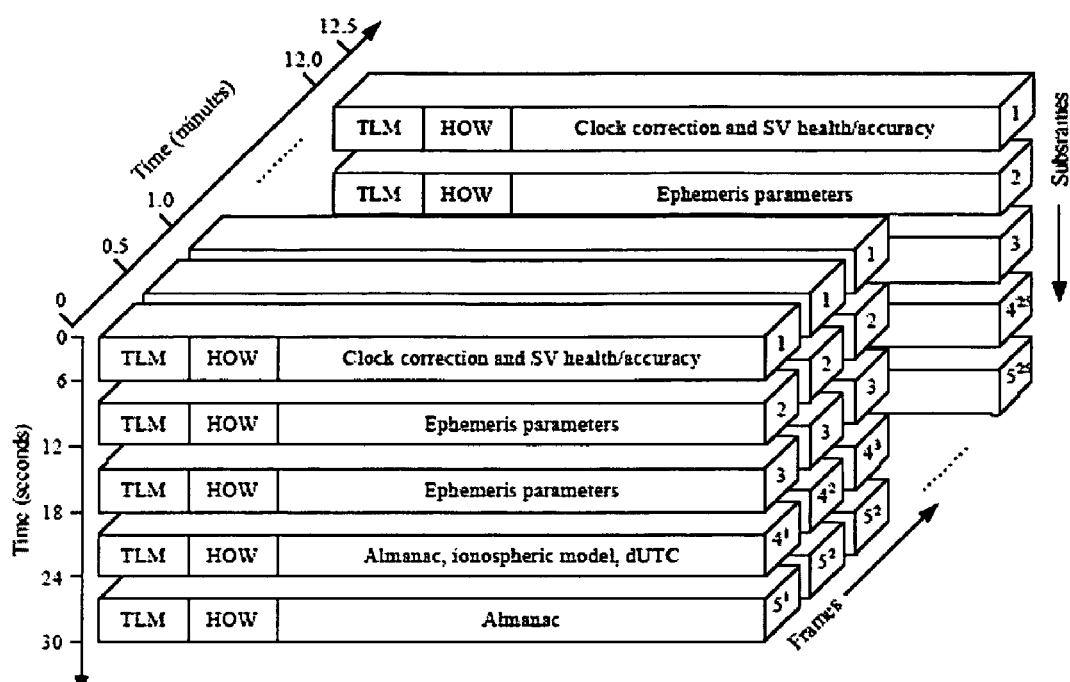
FIG. 2 is a schematic and general illustration showing data structure of navigation data including ephemeris and almanac.
Figure 3:
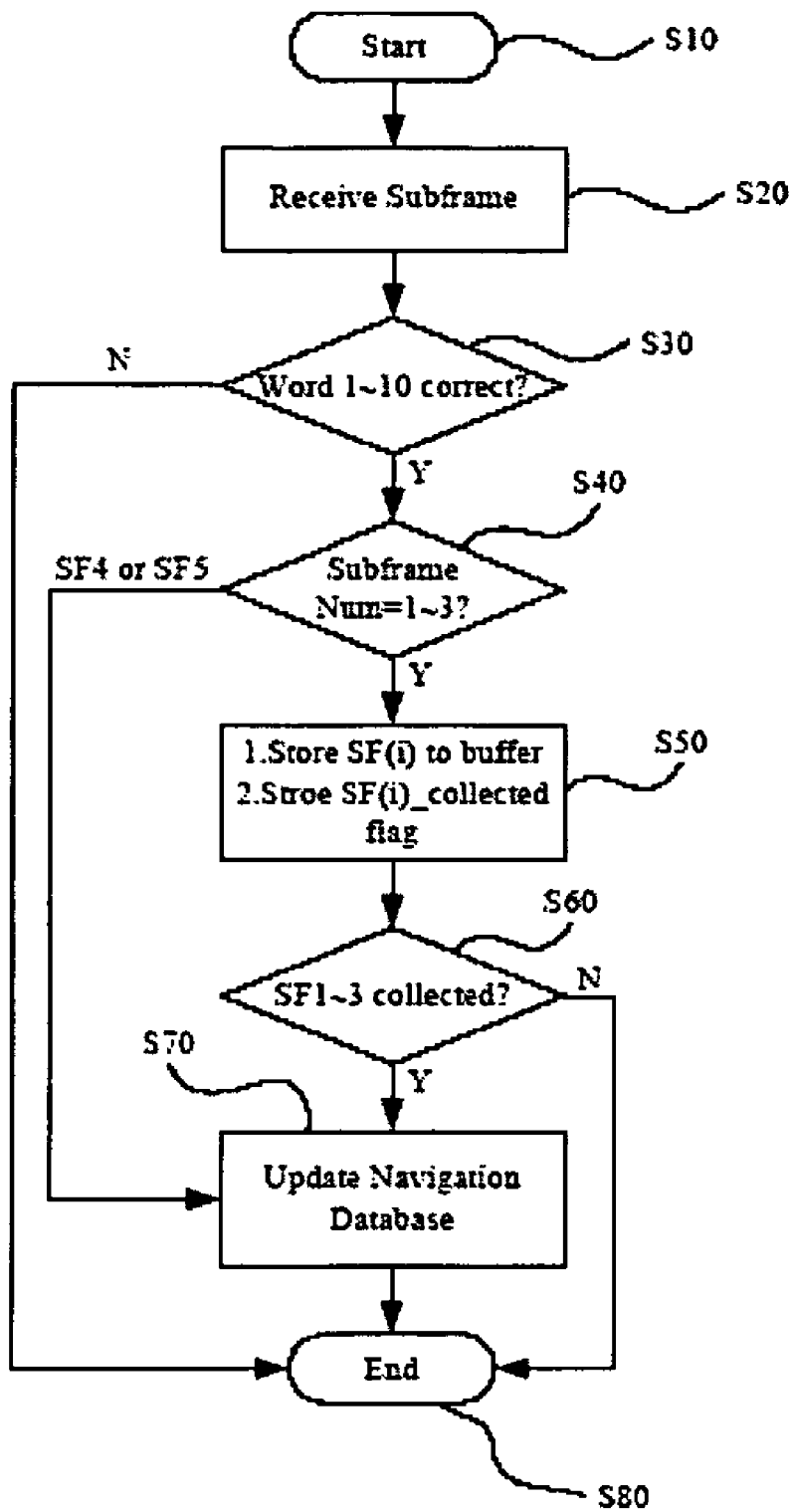
FIG. 3 is a flow chart showing a conventional process for collecting ephemeris.
Figure 4:
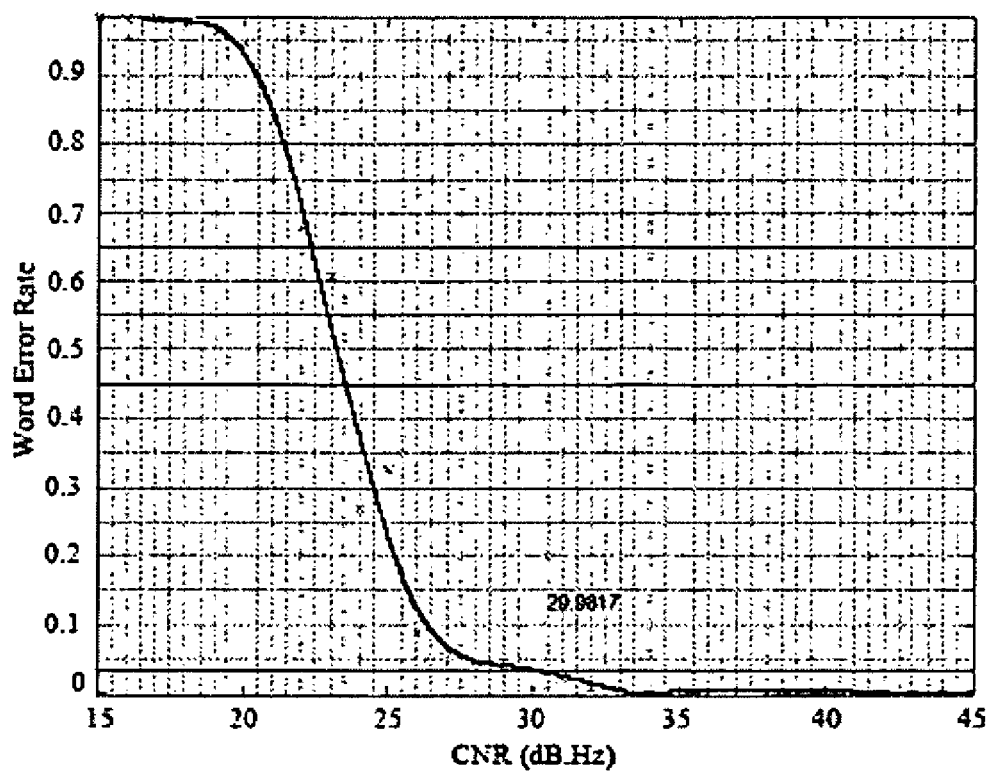
FIG. 4 is a diagram showing relationship between CNR and word error rate.

Collection of ephemeris is done by collecting correct Subframes 1 to 3 of navigation data. As mentioned, a subframe consists of 10 words. Word error rate (WER) is directly related to signal intensity. FIG. 4 is a diagram shows relationship between WER and CNR (carrier to noise ratio). As shown, the lower CNR is, the worse WER is. When CNR drops below 30 dB-Hz, WER will considerably raise. Assume that single word error rate (WER) is r, 10 words error rate will be $1-(1-r)^{10}$. For example, when CNR is 30 dB-Hz, single word error rate is about 0.04, then 10 words error rate will be $1-(1-0.04)^{10}=0.3352$. It is clear that the error rate is significantly greater when 10 words are considered as a sub-unit. Accordingly, we can divide a subframe into smaller-sub-units. Each sub-unit can have 1 word, 2 words or 5 words. As the example described above, if the single word error rate r is 0.04, then 10 words error rate=$1-1-r)^{10}$=0.3352

5 words error rate=$1-(1-r)^{5}$=0.1846

2 words error rate=$1-(1-r)^{2}$=0.0.784 where 1 word error rate=r=0.04

Figure 5:
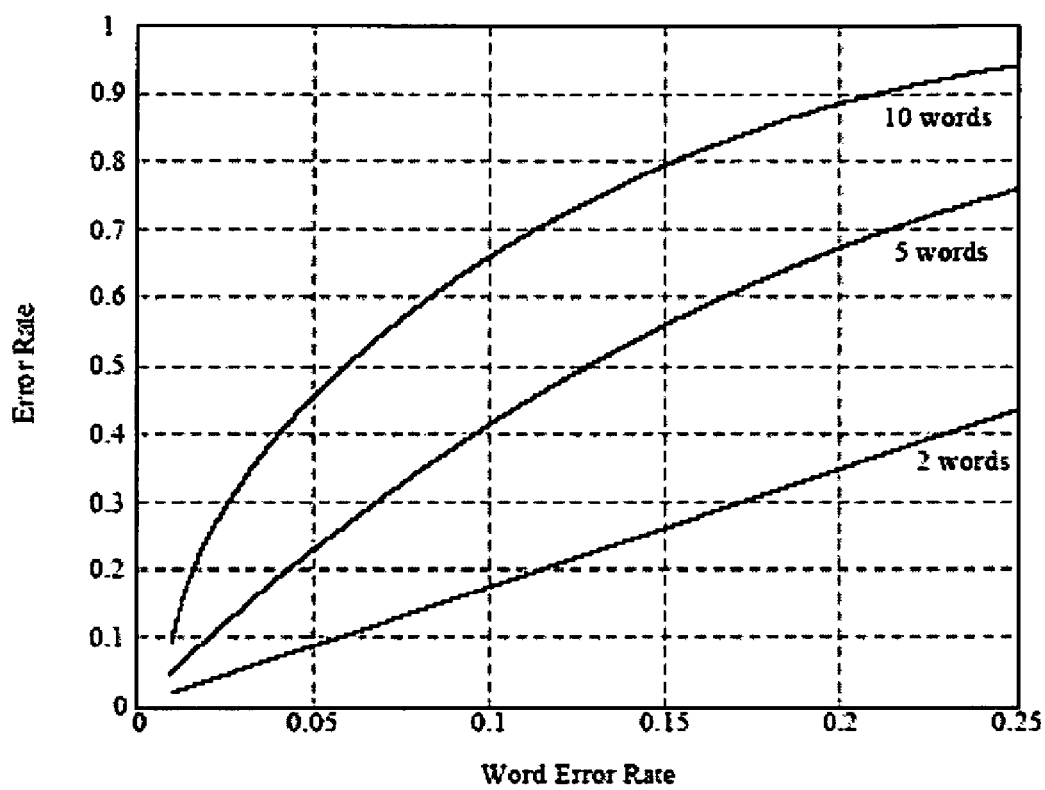
FIG. 5 is a diagram showing relationship between word error rate and sub-unit error rate of 10 words, 5 words and 2 words.

FIG. 5 is a diagram illustrating relationships between respective error rates of word sets 2 words, 5 words or 10 words versus word error rate. As can be seen, for a fix word error rate, the more words the word set includes, the higher the error rate is. Even if the word error rate is very low, the subframe (10 words) error rate is considerably high. Therefore, in the convention subframe collection scheme, it is likely that many 30-second repetitions of the subframes have to be waited until correct Subframes 1 to 3 are all collected.

The present invention provides a novel method to collect necessary subframes of the navigation data. In the subframe collecting method of the present invention, each subframe is partitioned into smaller sub-units. Each sub-unit consists of 5 words, 2 words or even only 1 word. The receiver checks if a sub-unit is correct. If the sub-unit is correct (error-free), then it is stored in a buffer. After all the words of Subframes 1-3 have been respectively collected, the collection of Subframes 1 to 3 is completed. Nevertheless, some words of the subframes are reserved and contain no information. Then collection for such reserved words can be omitted. In addition, information contained in some specific words is common information which is also transmitted in navigation data of other satellites. If the information has been obtained, then the word containing the same information is not necessary to be collected.

Figure 6:
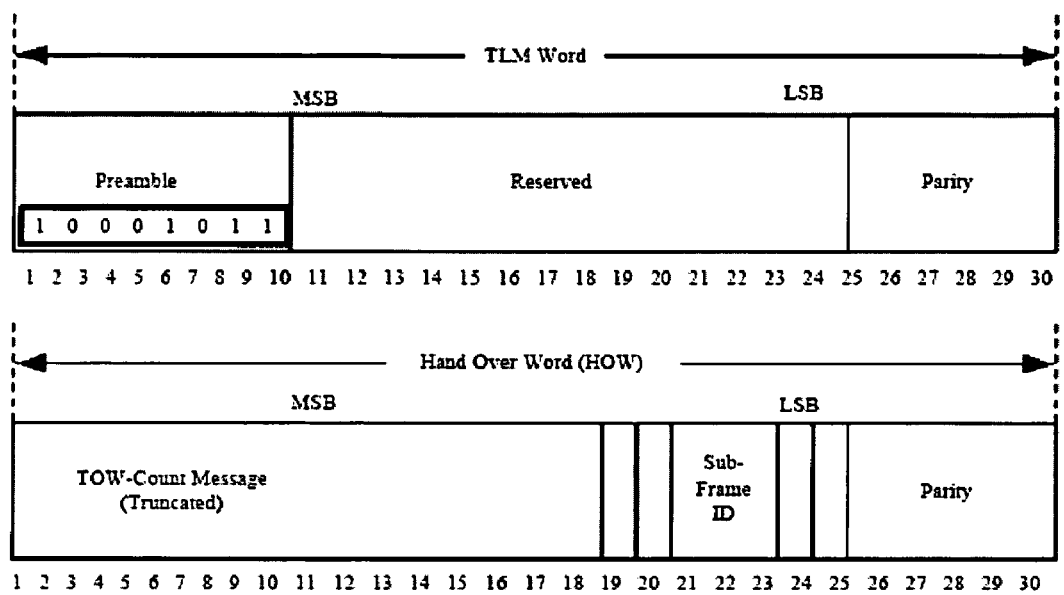
FIG. 6 is an illustration showing data structure of TLW word and HOW word.
Figure 7A:
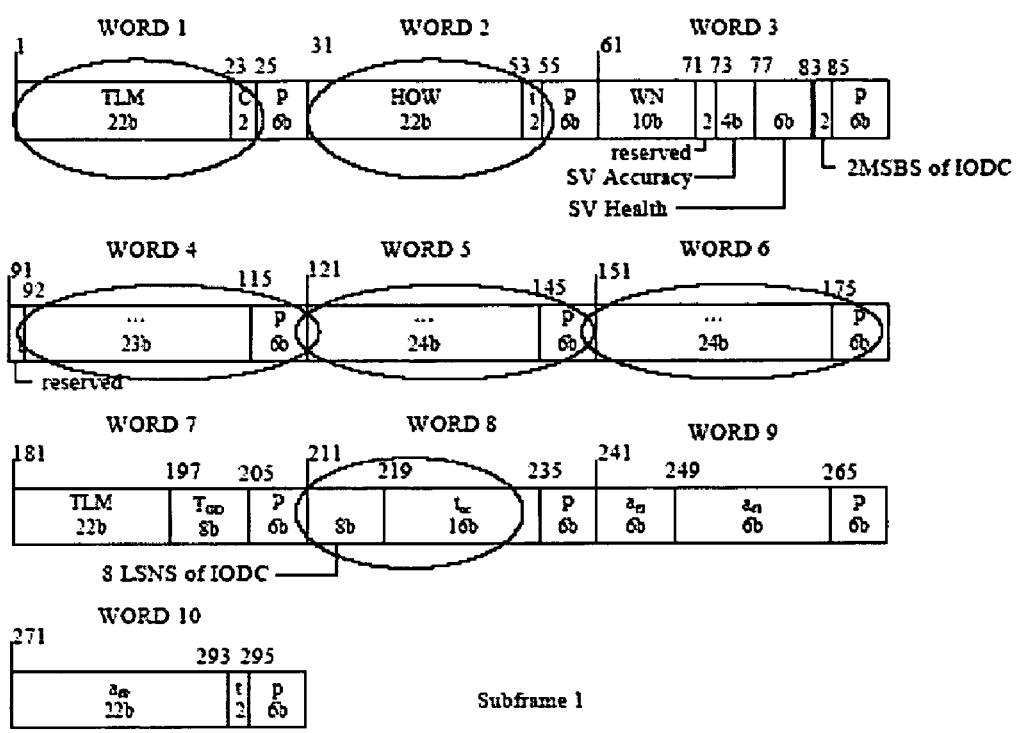
FIGS. 7A to 7C are illustrations respectively showing data structures of Subframes 1 to 3.
Figure 7B:
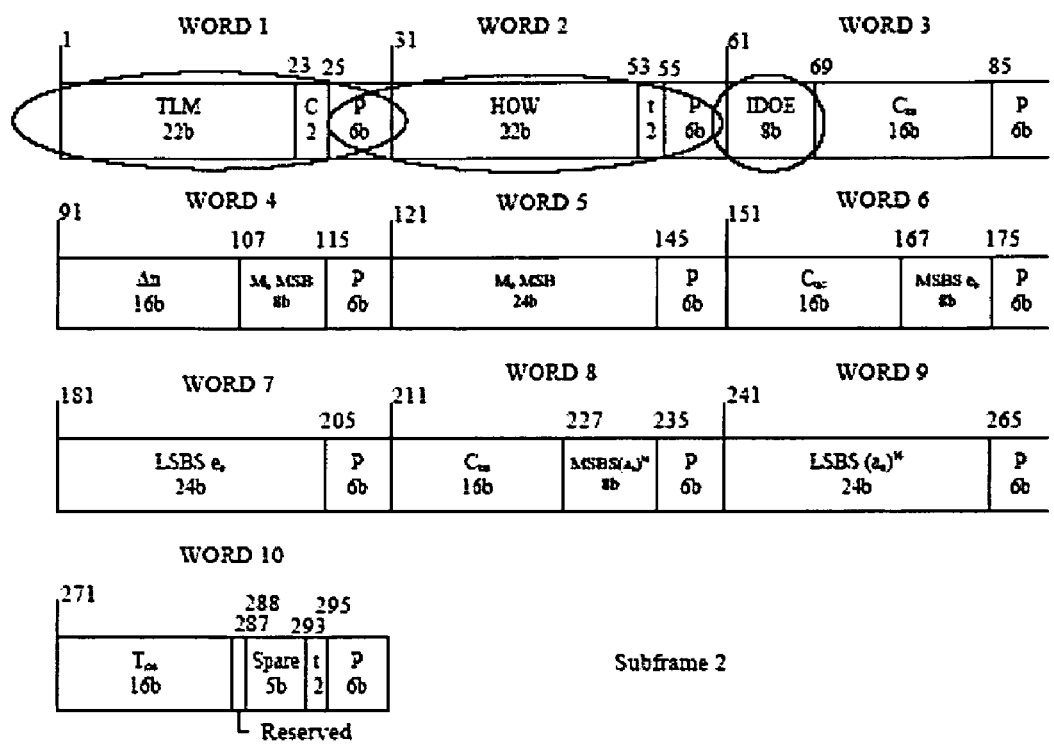
Figure 7C:
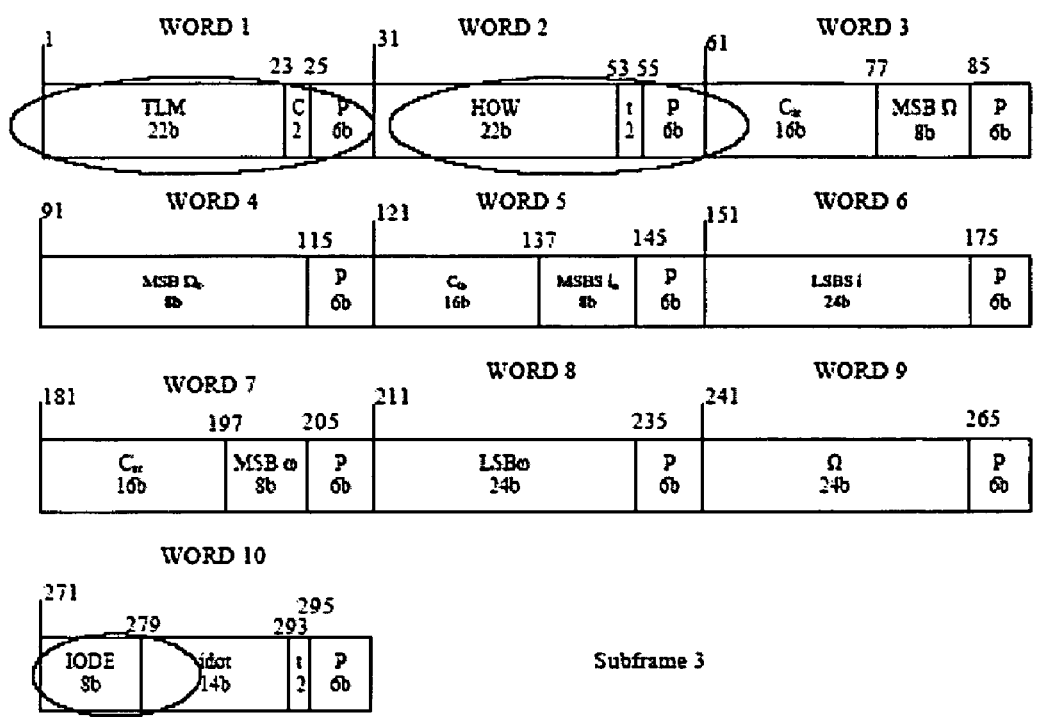

As described, the navigation data are transmitted in a form of pages. Five subframes make a page. Each subframe consists of ten words. Each word contains 6 parity bits. The first two words of all the subframes are the telemetry (TLM) word and hand over word (HOW). FIG. 6 shows data structures of TLM word and HOW word. The TLM word contains preamble, which is used for synchronization. The HOW word contains subframe ID (1, 2, 3, 4 and 5 or 001, 010, 011, 100, and 101) to identify one of the five subframes. FIGS. 7A to 7C respectively show data structures of Subframes 1 to 3 of the navigation data. Subframe 1 contains a 10 bits parameter IODC (Issue Of Data, Clock) in word 8. Subframe 2 contains an 8 bits parameter IODE (Issue Of Data, Ephemeris) in word 3, and Subframe 3 also contains an 8 bits IODE in word 10. Whenever the two IODEs from Subframes 2 and 3 and 8 LSBs (Least Significant Bits) of the IODC from Subframe 1 do not match, it means a data set cutover has occurred and new data must be collected. That is, the two IODEs from Subframes 2 and 3 and 8 LSBs (Least Significant Bits) of the IODC from Subframe 1 are consistent for the same set of data. These properties mentioned above can be utilized to check the correctness of subframe collection in accordance with the present invention. The details will be further described later.

Figure 8:
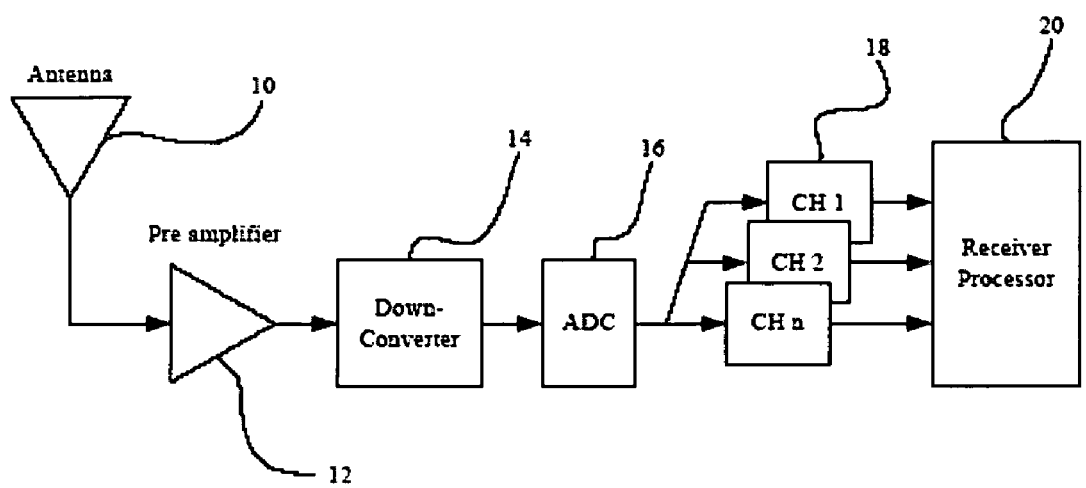
FIG. 8 is a schematic and general illustration showing a GPS receiver.

FIG. 8 shows typical receiver architecture of a GNSS system, such as GPS, Galileo and SBAS. In this architecture, A satellite signal is received via an antenna 10 and amplified by a preamplifer 12, down converted by a down-converter 14 to the IF (Immediate Frequency) stage. At this stage, the received signal is in analog form. Then, the received signal is converted into digital form by an ADC (analog-to-digital converter) 16. The receiver includes a plurality of channel correlators $CH_1$, $CH_2$ ... $CH_n$ 18, are used to perform signal correlation of multiple satellite signals respectively at the same time. The correlated signals are fed into a receiver processor 20. In the receiver processor 20, navigation data including ephemeris and almanac are collected.

Figure 9:
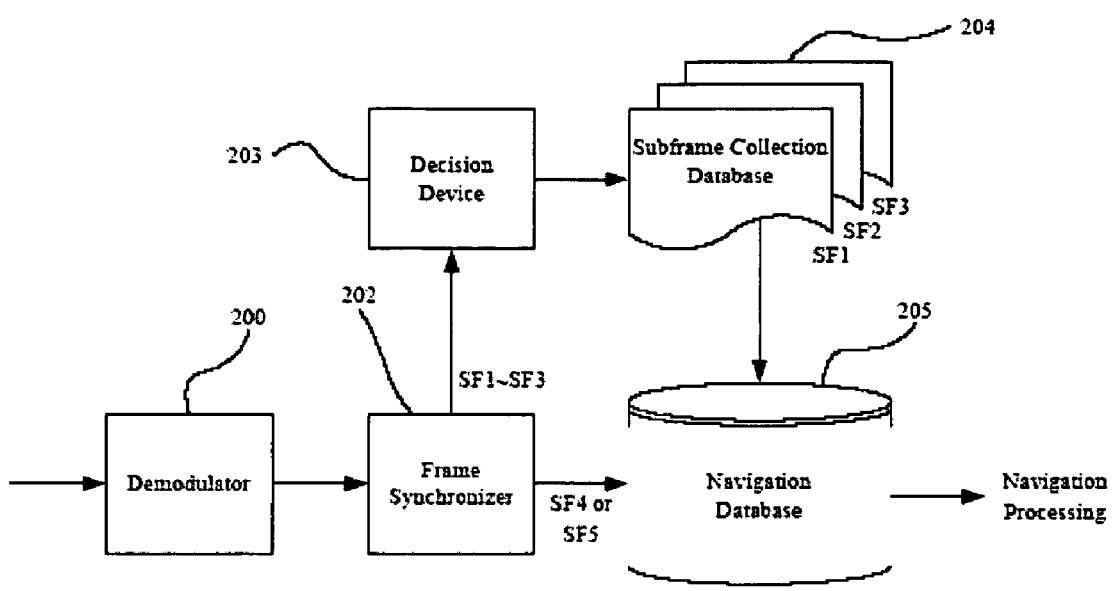
FIG. 9 is a block diagram showing a subframe collecting device in accordance with the present invention.
Figure 10:
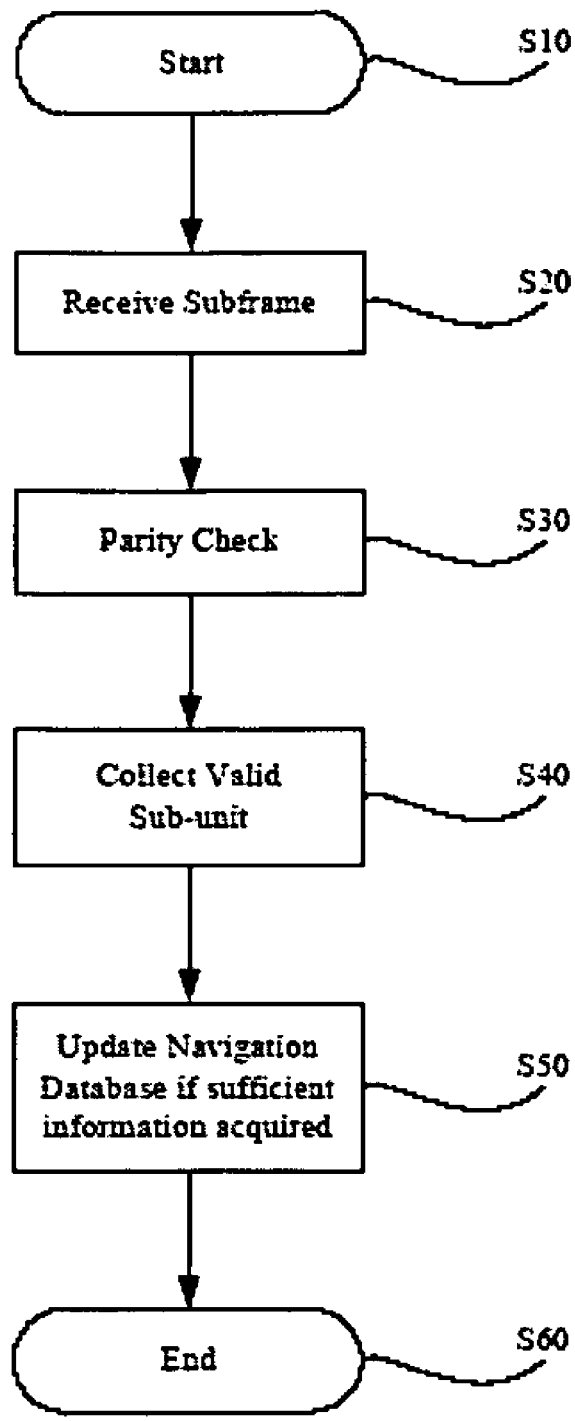
FIG. 10 is a flow chart showing a subframe collecting method in accordance with the present invention.

FIG. 9 is a functional block diagram schematically showing a subframe collecting apparatus in accordance with the present invention. In practice, the subframe collecting apparatus, especially components other than storages, can be implemented within the receiver processor 20 in a hardware or hardware-software hybrid form. In addition, FIG. 10 is a flow chart, which generally showing a subframe collecting method in accordance with the present invention. The subframe collecting apparatus of the present invention includes a demodulator 201 demodulating the signal to obtain subframes of the navigation data (step S20 of FIG. 10). The subframes are sent to a frame synchronizer 202 to check the parity of each word of the received subframe (step S30). In addition, the frame synchronizer 202 identifies ID of each demodulated subframe. In the present embodiment, Subframes 4 and 5 (SF4 and SF5) of one page of navigation data are directly passed to a navigation database 205. If a subframe is identified as one of Subframe 1 to 3, this subframe will be passed to a decision device 203. The decision device checks sub-units of the subframe. As mentioned, the sub-unit can be of 5 words, 2 words or one word when one subframe consists of 10 words. That is, the size of one sub-unit can be defined as desired. Preferably, the total words of one subframe are equally divided into sub-units. In the present embodiment, one word sub-unit is used as an example. When the decision device 203 determines that a word is valid, the decision device 203 sends this word to a subframe collection database 204 (step S40). The subframe collecting apparatus also executes some protective checking schemes to the subframe, the relative details will be further described later. In the present embodiment, the subframe collection database 204 is divided into three regions. These three regions are respective used to collect words of Subframes 1 to 3 (SF1, SF2 and SF3). After the collection for all words of SF1~SF3 is completed, that is, the information bearing words of each of SF1 to SF3 are all collected, the collected subframe SF1, SF2 and SF3 are transmitted to update the navigation database 205 (step S50).

As mentioned, the subframe collecting apparatus executes some protective checking schemes to each incoming subframe. The frame synchronizer 202 checks the TLM word (Word 1) and HOW word (Word 2) of this subframe. The TLM word contains preamble information. If the TLM word is erroneous, then the whole subframe is discarded. That is, no word of this subframe will be collected. The HOW (Word 2)

contains subframe ID, which indicates this subframe is which one of subframes SF1 to SF5. In the present embodiment, if the subframe is SF4 or SF5, the collection thereof is executed by subframe as prior art. If the subframe is SF4 or SF5, the frame synchronizer 202 checks parity of each word of the subframe, and pass it to the navigation database 205 if all words of the subframe are valid. If the subframe is determined as one of SF1 to SF3 by checking subframe ID in HOW word, the subframe is passed to the decision device 203. Normally, the sequence of the subframes passed to the decision device 203 will be SF1, SF2, SF3, SF1, SF2 . . . , the rest can be deduced accordingly. If the subframe IDs appear as SF1, SF2, SF2 . . . , for example, it means that there is an error. If TLM word and HOW word of the subframe are both valid, then the other words of this subframe can be collected. The other words are checked by parity checking, for example, the correct words are collected, while the erroneous words are not collected. As described, for the same set of data, IODC in Subframe 1 and IODE in Subframes 2 and 3 must match. If not, it means an update of the navigation data has occurred. At this time, the collected words which have been stored in the subframe collection database 204 should be cleared, and the valid words of the current subframe are collected and stored into the subframe collection database 204. Furthermore, each subframe may have some reserved words. There is no information in these reserved words. For example, Words 4 to 6 of Subframe 1 are reserved and have no information carried therein. Accordingly, it is not necessary to check the validity of Words 4 to 6 of SF1.

Figures 1, 11:
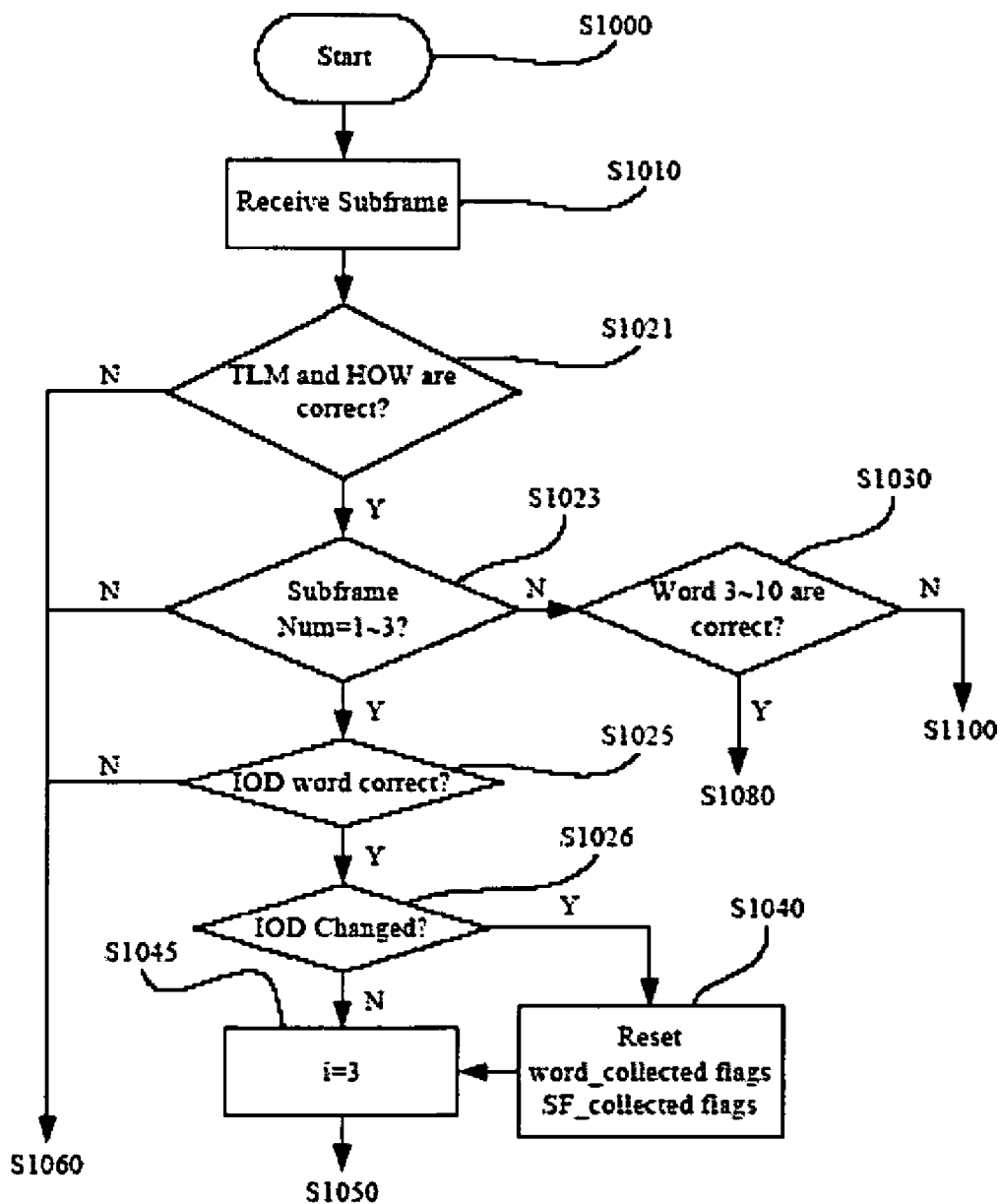
FIG. 11 is a flow chart showing an embodiment of the method in FIG. 10.
Figures 2, 11:
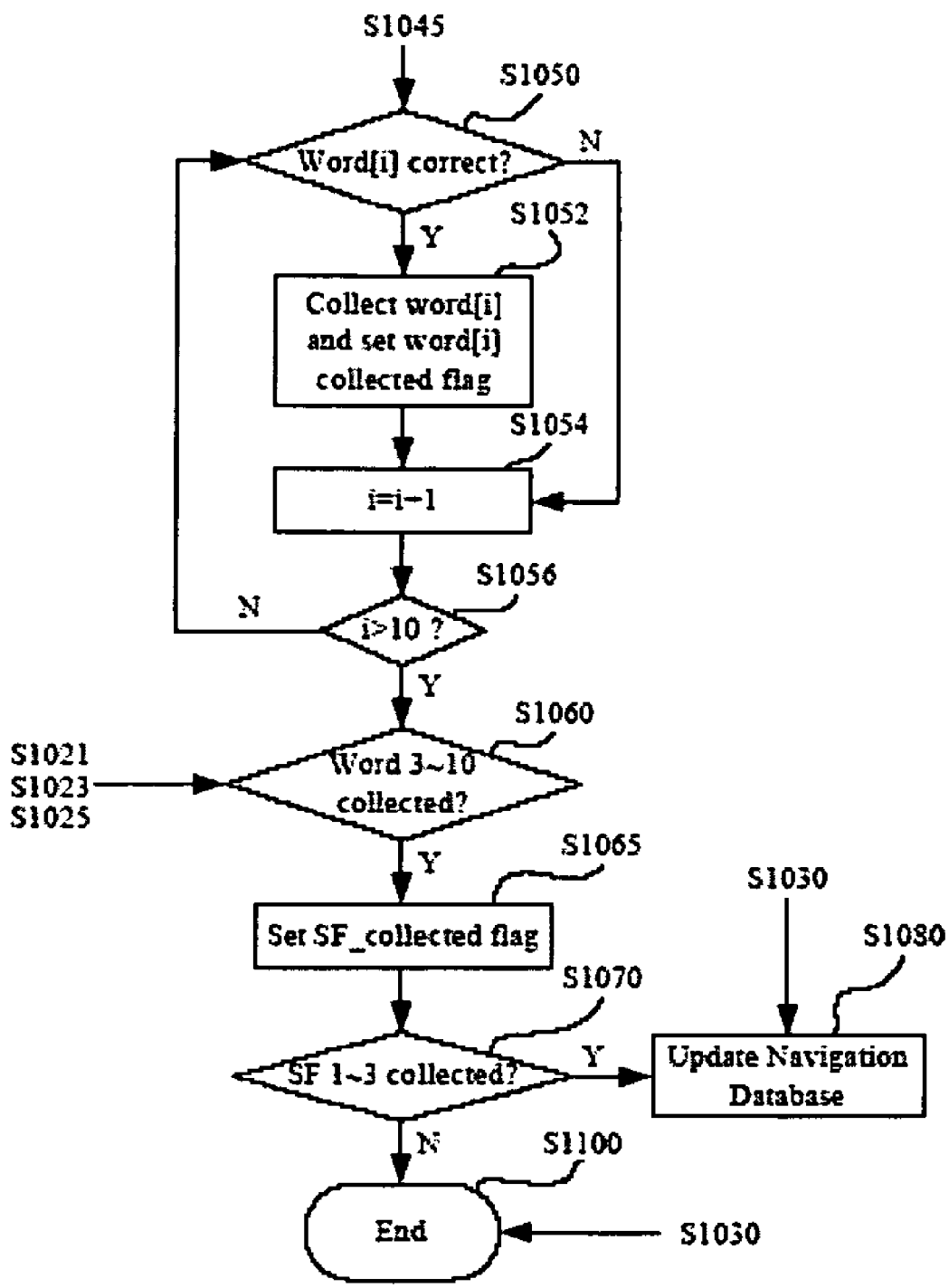

FIG. 11 is a flow chart illustrating an implementation embodiment of the subframe collecting method in accordance with the present invention. Please also refer to FIG. 9. The process of the subframe collecting method starts from step S1000. The demodulator 201 received correlated signals and demodulates the signals as data subframes (step S1010). The subframes are transmitted to the frame synchronizer 202. The frame synchronizer 202 checks the TLM word and HOW word of the subframe. As described, if the TLM word is not correct, the subframe will be discarded. Furthermore, the subframe is identified by checking the HOW word to know it is which one of Subframes 1 to 5. In step S1023, it is determined if the subframe is one of Subframes 1 to 3 (SF1~SF3). If so, the further checking will be executed. If not, it means that the subframe is SF4 or SF5, then the other words (i.e. Words 3~10) of the subframe are checked in step S1030. Usually, those words are checked by parity checking. If the other words are all corrected, then the subframe (SF4 or SF5) is stored into the navigation database (Step S1080). Otherwise, the subframe is not used. If the subframe is determined as one of SF1 to SF3 (step S1023), the subframe is passed to the decision device 203, then IOD word is checked. The IOD word checking comprises checking correctness of the word having the IOD information (step S1025), and checking whether the IODC of SF1 and IODE of SF2, SF3 match with each other (step S1026). In this example, no sub-unit collection (word collection) is executed to the subframe if the IOD word is not valid. If the IOD has changed, that is, the IODC and IODE do not match, the decision device 203 resets word_collected flags and SF_collected flags in step S1040. That is, the collection of ephemeris (SF1 to SF3) should be re-started, and previously collected words and even subframes should be discarded. In step S1045, a count i is set as 3, since the first two words of the subframe have been checked and collected. In step S1050, Word[i] (i=3~10) is checked and collected into the subframe collection database 204 word by word if it is correct (steps S1050, S1052, S1054, S1056). When Word[i] is collected, the word_collected flag thereof is set. Dummy words can be omitted. For example, if the subframe is identified as SF1, it is known that Word 4, Word 5 and Word 6 are reserved words, and have information. Accordingly, checking for these words can be omitted. This can be done by initially setting the word_collected flags of these words. In step S1060, the decision device 203 determines if Word 3 to Word 10 of each of SF1 to SF3 are all collected by checking the word_collected flags. If it is determined that Words 3 to 10 of SF1, for example, are all collected, the decision device 203 sets SF_collected flag for SF1 in step S1065. It is noted that such checking is executed all the time in the present embodiment. That is, once all words of one subframe are collected, the SF_collected flag for this subframe is set. In step S1070, the decision device 203 determines if SF1 to SF3 are all collected by checking SF_collected flags of SF1 to SF3. If SF1 to SF3 have been collected, the collected subframes are transferred to update the navigation database 205. Otherwise, the subframe collecting apparatus will wait for the next incoming subframe. The process ends in step S1100. The whole process is repeated. It is noted that other rationality checks can also incorporated into the process to eliminate unreasonable sub-unit information.

By using the present invention, the time to collect ephemeris can be significantly reduced. Therefore, the TTFF performance of the receiver can be improved, especially in weak signal or twinkle receiving (signal not stable) situation.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A method for collecting subframes of navigation data of a satellite, the method comprising steps of:
   receiving a subframe consisting of words, the words being divided into a plurality of sub-units;
   checking if the respective sub-units are valid;
   collecting required sub-units from the valid sub-units;
   determining if required sub-units of the subframe are collected; and
   waiting for the subframe repetitively transmitted the next time if not all the required sub-units of the subframe have been collected to collect sub-units still absent.

2. The method of claim 1, wherein each sub-unit consists of at least one word.

3. The method of claim 1, further comprising a step of checking a TLM (telemetry) word of the subframe after the receiving step, if the TLM is not valid, the subframe is discarded and no sub-units will be collected from the subframe.

4. The method of claim 1, further comprising a step of determining if the received subframe is a subframe carrying ephemeris data.

5. The method of claim 4, further comprising determining if all of the subframes carrying a set of ephemeris data are collected.

6. The method of claim 4, wherein a subframe ID of the subframe is checked to see whether the subframe is a subframe carrying ephemeris data.

7. The method of claim 1, wherein the subframe is deemed as collected if the required sub-units of the subframe have been collected.

8. The method of claim 1, further comprising determining if an update occurs in the navigation data, and abandoning old sub-units which have been collected when an update has occurred.

9. The method of claim 8, wherein IOD (Issue of Data) information is checked to determine whether an update has occurred.

10. The method of claim 1, wherein the checking step comprises firstly checking TLM word and HOW word of the subframe, if both the TLM and HOW words are correct, then the other portions of the subframe are subjected to checking, otherwise the subframe is discarded and no sub-units will be collected from the subframe.

11. The method of claim 1, wherein reserved words are omitted from checking.

12. An apparatus for collecting subframes of navigation data of a satellite, each subframe consisting of words, the words being divided into sub-units, the apparatus comprising:
 a navigation database for storing subframes of the navigation data;
 a subframe collection database; and
 a processor checking a subframe, determining if the subframe is one of subframes to be subjected to sub-unit collection, passing the subframe to the navigation database if it is not to be subjected to sub-unit collection, determining if respective sub-units of a subframe to be subjected to sub-unit collection are valid and storing the valid sub-units of the subframe into the subframe collection database,
 wherein after the subframe collection database has collected all required sub-units of one of the subframes, said one of the subframes is transmitted to update the navigation database.

13. The apparatus of claim 12, wherein the subframes subjected to sub-unit collection are transmitted together to update the navigation database after all required sub-units of these subframes are collected.

14. The apparatus of claim 12, wherein a reserved sub-unit of the subframe is not considered as a required sub-unit.

15. The apparatus of claim 12, wherein the processor checks if an update occurs in the navigation data, and indicate to abandon old sub-units which have been collected in the subframe collection database when an update has occurred.

16. The apparatus of claim 15, wherein the processor checks IOD (Issue of Data) information of the subframe to determine whether an update has occurred.

17. The apparatus of claim 12, wherein the processor checks a subframe ID of the subframe to determine whether it is to be subjected to sub-unit collection.

18. The apparatus of claim 12, wherein the processor determines the subframe is a subframe to be subjected to sub-unit collection if the subframe carries ephemeris data.

19. The apparatus of claim 12, the processor discards and collects no sub-unit from the subframe if not both TLM and HOW words of the subframe are correct.

20. The apparatus of claim 12, wherein the sub-unit comprises at least one word.

21. The apparatus of claim 12, wherein the processor comprises:
 a frame synchronizer checking to determine if the subframe is one of subframes to be subjected to sub-unit collection, and passing the subframe to the navigation database if it is not to be subjected to sub-unit collection; and
 a decision device receiving the subframe to be subjected to sub-unit collection from the frame synchronizer, determining if the respective sub-units of the subframe are valid and storing the valid sub-units of the subframe into the subframe collection database.

* * * * *